United States Patent [19]
Brown et al.

[11] Patent Number: 5,293,584
[45] Date of Patent: Mar. 8, 1994

[54] SPEECH RECOGNITION SYSTEM FOR NATURAL LANGUAGE TRANSLATION

[75] Inventors: Peter F. Brown, New York; Stephen A. Della Pietra, Pearl River; Vincent J. Della Pietra, Blauvelt; Frederick Jelinek, Briarcliff Manor; Robert L. Mercer, Yorktown Heights, all of N.Y.

[73] Assignee: International Business Machines Corporation, Armonk, N.Y.

[21] Appl. No.: 887,205

[22] Filed: May 21, 1992

[51] Int. Cl.$^5$ .............................................. G10L 5/00
[52] U.S. Cl. ....................................... 395/2.86; 395/2; 395/2.66; 395/2.79
[58] Field of Search .............. 381/43, 41; 395/2, 2.86, 395/2.66, 2.79

[56] References Cited

U.S. PATENT DOCUMENTS

| | | | |
|---|---|---|---|
| 4,443,856 | 4/1984 | Hashimoto et al. | 381/51 |
| 4,507,750 | 3/1985 | Frantz et al. | 395/2 |
| 4,613,944 | 9/1986 | Hashimoto et al. | 381/51 |
| 4,748,670 | 5/1988 | Bahl et al. | 395/2 |
| 4,759,068 | 7/1988 | Bahl et al. | 381/43 |
| 4,809,192 | 2/1989 | Wofhizuka et al. | 381/51 |
| 4,852,170 | 7/1989 | Bordeaux | 381/41 |
| 4,882,681 | 11/1989 | Brotz | 364/419 |
| 4,896,358 | 1/1990 | Bahler et al. | 381/41 |
| 4,903,304 | 2/1990 | Schlang et al. | 381/41 |
| 4,980,918 | 12/1990 | Bahl et al. | 381/43 |
| 4,984,177 | 1/1991 | Rondel et al. | 364/90 |
| 4,987,596 | 1/1991 | Ukita | 381/41 |
| 5,062,143 | 10/1991 | Schmitt | 382/36 |
| 5,072,452 | 12/1991 | Brown et al. | 381/43 |
| 5,146,405 | 9/1992 | Church | 364/420 |

FOREIGN PATENT DOCUMENTS 0376501 7/1990 European Pat. Off. .

OTHER PUBLICATIONS

Bahl, L. R. et al. "Apparatus and Method For Grouping Utterances of a Phoneme Into Context-Dependent Categories Based on Sound-Similarity For Automatic Speech Recognition." U.S. patent application Ser. No. 468,546, filed Jan. 23, 1990.

Bahl, L. R., et al. "Automatic Determination of Pronunciation of Words From Their Spellings." IBM Technical Disclosure Bulletin, vol. 32, No. 10B Mar. 1990, pp. 19≧23.

Bahl, L. R. et al. "Fast Algorithm for Deriving Acoustic Prototypes for Automatic Speech Recognition." U.S. patent application Ser. No. 730,714 Filed on Jul. 16, 1991.

Bahl, L. R., et al. "A Maximum Likelihood Approach to Continuous Speech Recognition." IEEE Transactions on Pattern Analysis and Machine Intelligence, vol. PAMI-5, No. 2, pp. 179-190, Mar. 1983.

(List continued on next page.)

Primary Examiner—Michael R. Fleming
Assistant Examiner—Tarif R. Hofiz
Attorney, Agent, or Firm—Marc D. Schechter

[57] ABSTRACT

A speech recognition system displays a source text of one or more words in a source language. The system has an acoustic processor for generating a sequence of coded representations of an utterance to be recognized. The utterance comprises a series of one or more words in a target language different from the source language. A set of one or more speech hypotheses, each comprising one or more words from the target language, are produced. Each speech hypothesis is modeled with an acoustic model. An acoustic match score for each speech hypothesis comprises an estimate of the closeness of a match between the acoustic model of the speech hypothesis and the sequence of coded representations of the utterance. A translation match score for each speech hypothesis comprises an estimate of the probability of occurrence of the speech hypothesis given the occurrence of the source text. A hypothesis score for each hypothesis comprises a combination of the acoustic match score and the translation match score. At least one word of one or more speech hypotheses having the best hypothesis scores is output as a recognition result.

36 Claims, 3 Drawing Sheets

OTHER PUBLICATIONS

Bahl, L. R., et al. "Speaker-Independent Label Coding Apparatus". U.S. patent application Ser. No. 673,189, filed Mar. 22, 1991.

Bahl, L. R., et al. "Vector Quantization Procedure For Speech Recognition Systems Using Discrete Parameter Phoneme-Based Markov Word Models." IBM Technical Disclosure Bulletin, vol. 32, No. 7, Dec. 1989, pp. 320–321.

Brown, P. F. et al. "Method and Apparatus For Translating A Series of Words From One Language to Another". U.S. patent application Ser. No. 736,278, Filed on Jul. 25, 1991.

Lucassen, J. M. et al. "An Information Theoretic Approach To The Automatic Determination Of Phonemic Baseforms." Proceedings of the 1984 IEEE Inter-Conference on Acoustics, Speech, and Signal Processing, vol. 3, pp. 42.5.1–42.5.4, Mar. 1984.

"Language and Machines-Computers in Translation and Linguistics". National Academy of the Sciences, Washington, D.C., Publication 1416, 1966.

SPEECH RECOGNITION SYSTEM FOR NATURAL LANGUAGE TRANSLATION

This invention was made with Government support under Contract Number N00014-91-C-0135 awarded by the office of Naval Research. The Government has certain rights in this invention.

BACKGROUND OF THE INVENTION

The invention relates to automatic speech recognition. More specifically, the invention relates to automatic speech recognition of an utterance in a target language of a translation of a source text in a source language different from the target language. For example, the invention may be used to recognize an utterance in English of a translation of a sentence in French.

In one study, it was found that the efficiency of a human translator who dictates a translation in one language corresponding to source text in another language, is greater than the efficiency of a human translator who writes or types a translation. (See, for example, "Language and Machines—Computers in Translation and Linguistics". National Academy of the Sciences, 1966.)

In one approach to speech recognition, speech hypotheses are scored using two probability models. One model is a language model which estimates the probability that the speech hypothesis would be uttered, but which uses no knowledge or information about the actual utterance to be recognized. The other model is an acoustic model which estimates the probability that an utterance of the speech hypothesis would produce an acoustic signal equal to the acoustic signal produced by the utterance to be recognized.

Statistical language models exploit the fact that not all word sequences occur naturally with equal probability. One simple model is the trigram model of English, in which it is assumed that the probability that a word will be spoken depends only on the previous two words that have been spoken. Trigram language models are relatively simple to produce, and have proven useful in their ability to predict words as they occur in natural language. More sophisticated language models based on probabilistic decision trees, stochastic context-free grammars, and automatically discovered classes of words have also been used.

While statistical language models which use no knowledge or information about the actual utterance to be recognized are useful in scoring speech hypotheses in a speech recognition system, the best scoring speech hypotheses do not always correctly identify the corresponding utterances to be recognized.

SUMMARY OF THE INVENTION

It is an object of the invention the provide a speech recognition system which has an improved language model for increasing the accuracy of speech recognition.

It is another object of the invention the provide a speech recognition system which estimates the probability of occurrence of each speech hypothesis using additional knowledge or information about the actual utterance to be recognized.

The accuracy and the speed of a speech recognition system depends on a large number of factors one important factor is the complexity of the language, as represented by the number of possible word sequences in the language, and the probability of occurrence of each possible word string. If a language model is able to reduce the uncertainty, or entropy, of the possible word sequences being recognized, then the recognition result will be more accurate than with higher uncertainty.

In the speech recognition system and method according to the present invention, information about the source sentence being translated is used to estimate the probability that each speech hypothesis would be uttered. This probability is estimated with the aid of a translation model.

According to the invention, a speech recognition system comprises means for displaying a source text. The source text comprises one or more words in a source language. An acoustic processor generates a sequence of coded representations of an utterance to be recognized. The utterance comprising a series of one or more words in a target language different from the source language.

The speech recognition system further includes a speech hypothesis generator for producing a set of one or more speech hypotheses. Each speech hypothesis comprises one or more words from the target language. An acoustic model generator produces an acoustic model of each speech hypothesis.

An acoustic match score generator produces an acoustic match score for each speech hypothesis. Each acoustic match score comprises an estimate of the closeness of a match between the acoustic model of the speech hypothesis and the sequence of coded representations of the utterance produced by the acoustic processor.

A translation match score generator produces a translation match score for each speech hypothesis. Each translation match score comprises an estimate of the probability of occurrence of the speech hypothesis given the occurrence of the source text.

A hypothesis score generator produces a hypothesis score for each hypothesis. Each hypothesis score comprises a combination of the acoustic match score and the translation match score for the hypothesis.

Finally, the speech recognition system includes a memory for storing a subset of one or more speech hypotheses, from the set of speech hypotheses, having the best hypothesis scores, and an output for outputting at least one word of one or more of the speech hypotheses in the subset of speech hypotheses having the best hypothesis scores.

The speech hypothesis generator may comprise, for example, a candidate word generator for producing a set of candidate words. The set of candidate words consists solely of words in the target language which are partial or full translations of words in the source text. One or more speech hypotheses are generated solely from words in the set of candidate words.

The translation match score for a speech hypothesis may comprise, for example, an estimate of the probability of occurrence of the source text given the occurrence of the speech hypothesis, combined with an estimate of the probability of occurrence of the speech hypothesis. The probability of occurrence of the source text given the occurrence of the speech hypothesis may comprise, for example, an estimate, for each word in the source text, of the probability of the word in the source, text given the occurrence of each word in the speech hypothesis.

The acoustic match score may comprise, for example, an estimate of the probability of occurrence of the sequence of coded representations of the utterance given the occurrence of the speech hypothesis. The hypothesis score may then comprise the product of the acoustic match score multiplied by the translation match score.

The speech recognition system may further comprise a source vocabulary memory storing a source vocabulary of words in the source language, and a comparator for comparing each word in the source text with each word in the source vocabulary to identify each word in the source text which is not in the source vocabulary. An acoustic model generator produces an acoustic model of each word in the source text which is not in the source vocabulary.

Each word in the source text has a spelling comprising one or more letters. Each letter is either upper case or lower case. The acoustic model generator produces an acoustic model of each word in the source text which is not in the source vocabulary, and which has an upper case first letter.

The acoustic model generator may comprise, for example, a memory for storing a plurality of acoustic letter models. An acoustic model of a word is then produced by replacing each letter in the spelling of the word with an acoustic letter model corresponding to the letter.

By providing a speech recognition system and method according to the invention with an improved language model having a translation model for estimating the probability that each speech hypothesis would be uttered given the occurrence of the source text, the accuracy and the speed of speech recognition can be improved.

DESCRIPTION OF THE PREFERRED EMBODIMENTS

Figure 1:
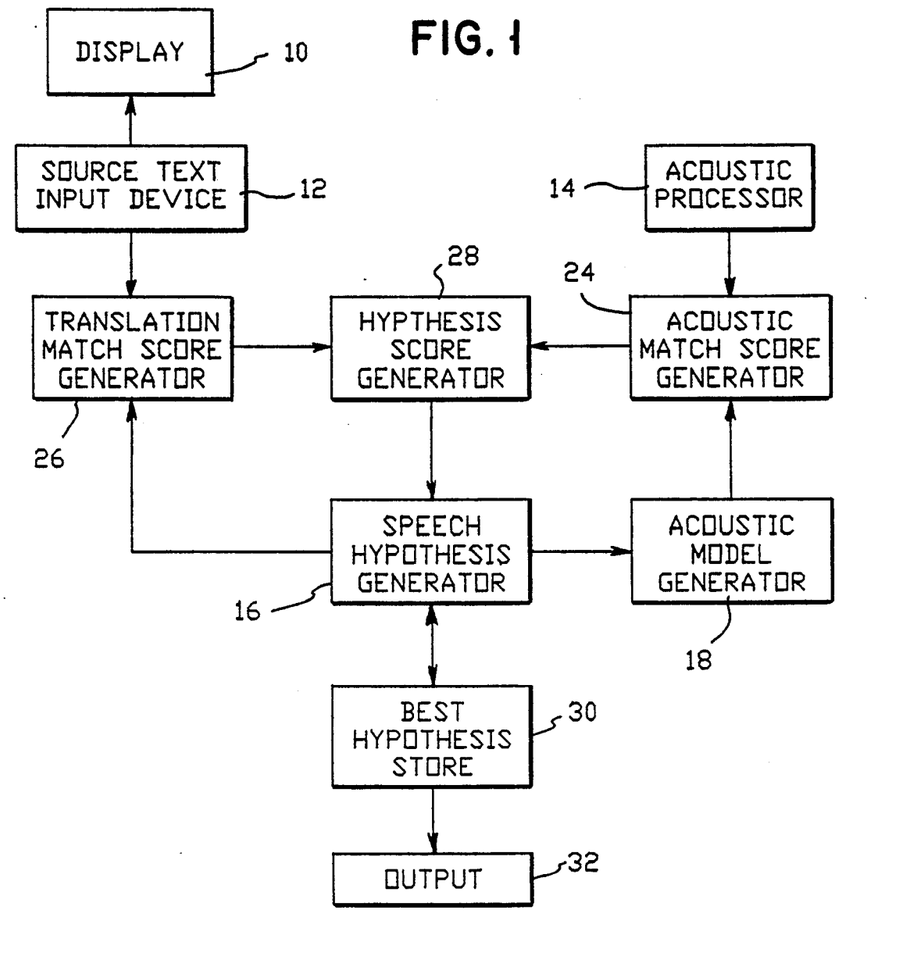
FIG. 1 is a block diagram of an example of a speech recognition system according to the invention.

Referring to FIG. 1, the speech recognition system comprises a display 10 for displaying a source text. The source text comprises one or more words in a source language, such as French. The source text may be provided to the display by, for example, a source text input device 12 such as a computer system.

The speech recognition system further comprises an acoustic processor 14 for generating a sequence of coded representations of an utterance to be recognized. The utterance comprises, for example, a series of one or more words in a target language, such as English, different from the source language.

A speech hypothesis generator 16 generates a set of one or more speech hypotheses. Each speech hypothesis comprises one or more words from the target language. For a sentence of, for example, 10 words out of a target language vocabulary of 20,000 words, there are $20,000^{10} = 1.024 \times 10^{43}$ possible hypotheses.

With such a large number of hypotheses, it is not feasible to generate all possible hypotheses. Therefore, preferably, the hypothesis generator does not generate all possible hypotheses for the utterance to be recognized. Instead, the hypothesis generator starts by finding a reasonable number of single-word hypotheses which are good candidates for a portion of the utterance to be recognized, and systematically searches for successively longer word strings which are good candidates for longer portions of the utterance to be recognized one such search algorithm is described, for example, in U.S. Pat. No. 4,748,670 by Lalit R. Bahl et al entitled "Apparatus And Method For Determining A Likely Word Sequence From Labels Generated By An Acoustic Processor."

Figure 2:
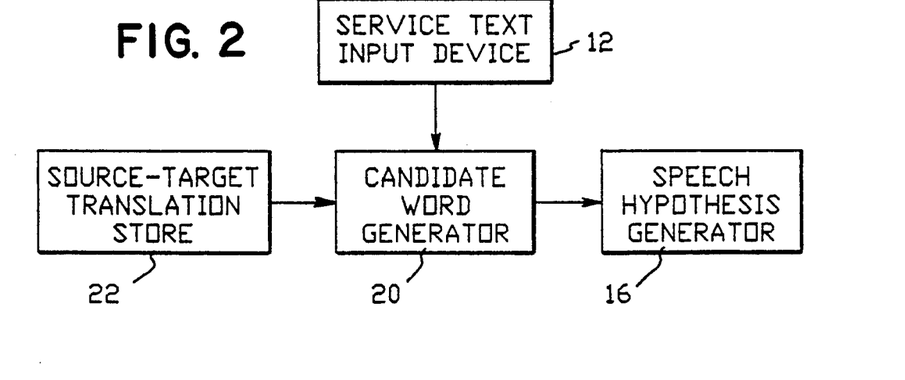
FIG. 2 is a block diagram of a portion of another example of a speech recognition system according to the invention.

FIG. 2 is a block diagram of a portion of one example of a speech recognition system according to the invention. In this embodiment, the speech recognition system further comprises a candidate word generator 20 for generating a set of candidate words consisting solely of words in the target language which are partial or full translations of words in the source text. The candidate word generator 20 receives the source text from source text input device 12, and receives translations of each word in the source text from a source-text translation store 22. From the source text and from the translations, candidate word generator 20 generates a set of candidate words consisting solely of words in the target language which are partial or full translations of words in the source text.

The set of candidate words is provided to speech hypothesis generator 16. Preferably, in this embodiment, the speech hypothesis generator 16 generates one or more speech hypotheses solely from words in the set of candidate words from candidate word generator 20.

Returning to FIG. 1, the speech recognition system further comprises an acoustic model generator 18 for generating an acoustic model for each speech hypothesis generated by the speech hypothesis generator 16. The acoustic model generator 18 forms an acoustic model of a speech hypothesis by substituting, for each word in the speech hypothesis, an acoustic model of the word from a set of stored acoustic models.

The stored acoustic models may be, for example, Markov models or other dynamic programming type models. The parameters of the acoustic Markov models may be estimated from a known uttered training text by, for example, the Forward-Backward Algorithm. (See, for example, L. R. Bahl, et al. "A Maximum Likelihood Approach to Continuous Speech Recognition." *IEEE Transactions on Pattern Analysis and Machine Intelligence*, Volume PAMI-5, No. 2, pages 179-190, March 1983.) The models may be context-independent or context-dependent. The models may be built up from submodels of phonemes.

Context-independent acoustic Markov models may be produced, for example, by the method described in U.S. Pat. No. 4,759,068 entitled "Constructing Markov Models of Words From Multiple Utterances," or by any other known method of generating acoustic word models.

For context-dependent acoustic Markov word models, the context can be, for example, manually or automatically selected. One method of automatically selecting context is described in U.S. patent application Ser. No. 468,546, filed Jan. 23, 1990, entitled "Apparatus and Method For Grouping Utterances of a Phoneme Into Context-Dependent Categories Based on Sound-Similarity For Automatic Speech Recognition."

An acoustic match score generator 24 generates an acoustic match score for each speech hypothesis. Each acoustic match score comprises an estimate of the closeness of a match between the acoustic model of the speech hypothesis and the sequence of coded representations of the utterance.

When the acoustic models are Markov models, acoustic match scores may be obtained, for example, by the forward pass of the Forward-Backward Algorithm. (See, for example, L. R. Bahl, et al, March 1983, cited above.)

As discussed above, the speech hypothesis generator 16 generates hypotheses by finding a reasonable number of single-word hypotheses which are good candidates for a portion of the utterance to be recognized, and by systematically searching for successively longer word strings which are good candidates for longer portions of the utterance to be recognized.

The acoustic match score generator 24 preferably generates two types of acoustic match scores: (1) a relatively fast, relatively less accurate acoustic match score, and (2) a relatively slow, relatively more accurate "detailed" acoustic match score. The "fast" match examines at least a portion of every word in the target vocabulary to find a number of words which are good possibilities for extending the candidate word strings. The fast match estimates the closeness of a match between an acoustic fast match model of a word and a portion of the sequence of coded representations of the utterance. The "detailed" match examines only those words which the "fast" match determines to be good possibilities for extending the candidate word strings. The "detailed" acoustic match score estimates the closeness of a match between an acoustic detailed match model of a word and the sequence of coded representations of the utterance.

Still referring to FIG. 1, the speech recognition system further comprises a translation match score generator 26 for generating a translation match score for each speech hypothesis. Each translation match score comprises an estimate of the probability of occurrence of the speech hypothesis given the occurrence of the source text.

The translation match score generator 26 will now be described. The role of the translation match score generator is to compute a translation match score Score(S,T•) that a finite sequence S of source words is the translation of a sequence of target words beginning with the finite sequence T. Here and in the following, T• will denote the set of all complete target sentences that begin with the sequence of target words T. A complete sentence is a sequence that ends in a special end-of-sentence marker.

In one embodiment, the translation match score Score(S, T•) is an estimate of a conditional probability $P(T•|S)$, while in another embodiment the translation match score is an estimate of a joint probability $P(S, T•)$.

In the latter embodiment, the translation match score generator includes three components:

1. a language match score generator which computes an estimate $P(T)$ of the prior probability of a target word sequence T;
2. a conditional translation match score generator which computes an estimate $P(S|T)$ of the conditional probability of a source word sequence S given a target word sequence T; and
3. a combined score generator which uses the language match score and the conditional translation match score to produce an estimate of a joint probability $P(S, T•)$.

The combined match score generator will now be described. In the prior art, language match scores and conditional translation match scores are combined only when the words of S are generated from the words T and no other words. In contrast, the combined match score generator must estimate a combined score when S is generated from the words of T together with some additional unspecified words.

In one embodiment, this combined score is computed as a sum over all complete sentence T' in T•:

$$P(S, T•) = \sum_{T' \in T•} P(T') P(S|T') \quad [1]$$

The probability $P(T')$ is obtained from the language match score generator, and the probability $P(S|T')$ is obtained from the conditional translation match score generator.

In other embodiments, various approximations are made to simplify the computation of this sum. One such approximation is $$P(S, T•) = \sum_{k=0}^{n} P(T•^k) P(S|T\alpha^k) \quad [2]$$

Here $T•^k$ denotes the set of target sequences that begin with T and contain k additional words, n is a parameter specifying the maximum allowed number of additional words, and $\alpha$ is a special generic target word. For the specific embodiments of the language match score generator and the conditional translation match score generator described above, this approximation leads to the formula $$P(S, T•) = \quad [3]$$

$$p_1(T_1) p_2(T_2|T_1) \prod_{j=3}^{m} p_3(T_j|T_{j-2} T_{j-1}) \sum_{k=0}^{n} p_9(k|T) p_4(l|m+k)$$

$$\prod_{i=1}^{l} \left( \sum_{j=1}^{m} p_5(S_i|T_j) p_6(i|j,l) + k p_7(S_i|\alpha) p_8(i|l) \right)$$

Here $p_7(s|\alpha)$ are average word translation probabilities, and $p_8(i|l)$ are average alignment probabilities. Also $p_9(k|T)$ is the probability of the set of all complete sentences which begin with T and contain k additional words. In one embodiment this probability is estimated as $$p_9(k|T) = \begin{cases} \delta_{k0} \text{ if } T \text{ is a complete sentence} \\ q(1-q)^k \text{ otherwise} \end{cases} \quad [4]$$

where q is an estimate of the unigram probability of the end-of-sentence marker.

The conditional translation match score generator will now be described. The task of the conditional translation match score generator is to compute a conditional translation score $P(S|T)$ of a sequence S of source given a sequence T of target words.

In one embodiment of a conditional translation match score generator, the probability of S given T is computed as $$P(S|T) = p_4(l|m) \prod_{i=1}^{l} \sum_{j=1}^{m} p_5(S_i|T_j)p_6(i|j,l) \quad [5]$$

Here l is the length of S, m is the length of T, $S_i$ is the $i^{th}$ word of S, and $T_j$ is the $j^{th}$ word of T. The parameters of the model are:

1. sequence length probabilities $p_4(l|m)$ satisfying $$\sum_l p_4(l|m) = 1;$$

2. word translation probabilities $p_5(s|t)$ for source words s and target words t satisfying $$\sum_s p_5(s|t) = 1;$$

3. alignment probabilities $P_6(i|j, l)$ satisfying $$\sum_i p_6(i|j,l) = 1;$$

Values for these parameters can be determined from a large quantity of aligned source-target sentence pairs $(S^l, T^l) \ldots (S^n, T^n)$ using a procedure that is explained in detail in the above mentioned patent. Briefly, this procedure works as follows. The probability of the aligned sentence pairs is a computable function of the parameter values. The goal of the procedure it to find parameter values which locally maximize this function. This is accomplished iteratively. At each step of the iteration, the parameter values are updated according to the formulas:

$$p_5(s|t) \rightarrow \frac{1}{\lambda_5} c_5(s|t); \quad p_6(j|i,l) \rightarrow \frac{1}{\lambda_6} c_6(j|i,l) \quad [6]$$

where $$c_5(s|t) = \sum_n c(s|t; S^n, T^n); \quad c_6(j|i,l) = \sum_n c(j|i; S^n, T^n) \quad [7]$$

$$c_5(s|t; S,T) = \quad [8]$$

$$\sum_{i=1}^{l} \sum_{j=1}^{m} \delta(s,S_i)\delta(t,T_j)a(j,i,S,T); \quad c_6(j|i; S,T) = a(j,i,S,T)$$

$$a(j,i,S,T) = \frac{\beta(j,i,S,T)}{\sum_{i'} \beta(j,i',S,T)}; \quad \beta(j,i,S,T) = p_5(S_i|T_j)p_6(j|i,l) \quad [9]$$

Here the sum on n runs over all source-target sentence pairs $(S^n, T^n)$. The normalization constants $\lambda_5$ and $\lambda_6$ are chosen so that the updated quantities are conditional probabilities. (See, U.S. patent application Ser. No. 736,278, filed on Jul. 25, 1991, by Peter F. Brown et al entitled "Method and System For Natural Language Translation.")

The language match score generator will now be described. The task of the language match score generator is to compute a score P(T) for a finite sequence T of target words.

The probability P(T) of occurrence of the target word sequence may be approximated by the product of n-gram probabilities for all n-grams in each string. That is, the probability of a sequence of words may be approximated by the product of the conditional probabilities of each word in the string, given the occurrence of the n−1 words (or absence of words) preceding each word. For example, if n=3, each trigram probability may represent the probability of occurrence of the third word in the trigram, given the occurrence of the first two words in the trigram.

The conditional probabilities may be determined empirically by examining large bodies of text. For example, the conditional probability $\tilde{f}(W_z|W_xW_y)$ of word $W_z$ given the occurrence of the string $W_xW_y$ may be estimated from the equation $$\tilde{f}(W_z|W_xW_y) = \quad [10]$$

$$\lambda_1 f_1(W_z|W_xW_y) + \lambda_2 f_2(W_z|W_y) + \lambda_3 f_3(W_z) + \lambda_4 f_4$$

where $$f_1(W_z|W_xW_y) = \frac{n_{xyz}}{n_{xy}} \quad [11]$$

$$f_2(W_z|W_y) = \frac{n_{yz}}{n_y} \quad [12]$$

$$f_3(W_z) = \frac{n_z}{n} \quad [13]$$

$$f_4 = \frac{1}{n} \quad [14]$$

and $$\lambda_1 + \lambda_2 + \lambda_3 + \lambda_4 = 1 \quad [15]$$

In equations [11]–[14] the count $n_{xyz}$ is the number of occurrences of the trigram $W_xW_yW_z$ in a large body of training text. The count $n_{xy}$ is the number of occurrence; of the bigram $W_xW_y$ in the training text. Similarly, $n_{yx}$ is the number of occurrences of the bigram $W_yW_z$ in the training text, $n_y$ is the number of occurrences of word $W_y$, $n_z$ is the number of occurrences of word $W_z$, and n is the total number of words in the training text. The values of the coefficients $\lambda_1, \lambda_2, \lambda_3,$ and $\lambda_4$ in equations [10] and [15] may be estimated by the deleted interpolation method. (See, L. R. Bahl et al, March 1983, cited above.)

In a variation of the trigram language model, the probability P(T) is computed as $$P(T) = p_1(T_1)p_2(T_2|T_1) \prod_{j=3}^{m} p_3(T_j|T_{j-2}T_{j-1}) \quad [16]$$

where $$p_3(t_3|t_1t_2) = \quad [17]$$

$$\lambda_3(c)f_3(t_3|t_1t_2) + \lambda_2(c)f_2(t_3|t_2) + \lambda_1(c)f_1(t_3) + \lambda_0(c)$$

with $C=C(t_1t_2)$ here m is the length of T and $T_j$ is the $j^{th}$ word of T. The parameters of the model are:

1. conditional frequency distributions $f_3(t_3|t_1t_2)$, $f_2(t_3|t_2)$, $f_1(t_3)$, for target words $t_1,t_2,t_3$;
2. a bucketing scheme c which assigns word pairs $t_1t_2$ small number of classes;

3. non-negative interpolation functions $\lambda_i(c)$, $i=0,1,2,3$, which satisfy $$\sum_i \lambda_i = 1$$

Values for these parameters can be determined from a large quantity of training target text as described above.

Returning to FIG. 1, the speech recognition system comprises a hypothesis score generator 28 for generating a hypothesis score for each hypothesis. Each hypothesis score comprises a combination of the acoustic match score and the translation match score for the hypothesis.

The speech recognition system further comprises a storage device 30 for storing a subset of one or more speech hypotheses, from the set of speech hypotheses, having the best hypothesis scores. An output device 32 outputs at least one word of one or more of the speech hypotheses in the subset of speech hypotheses having the best hypothesis scores.

Figure 3:
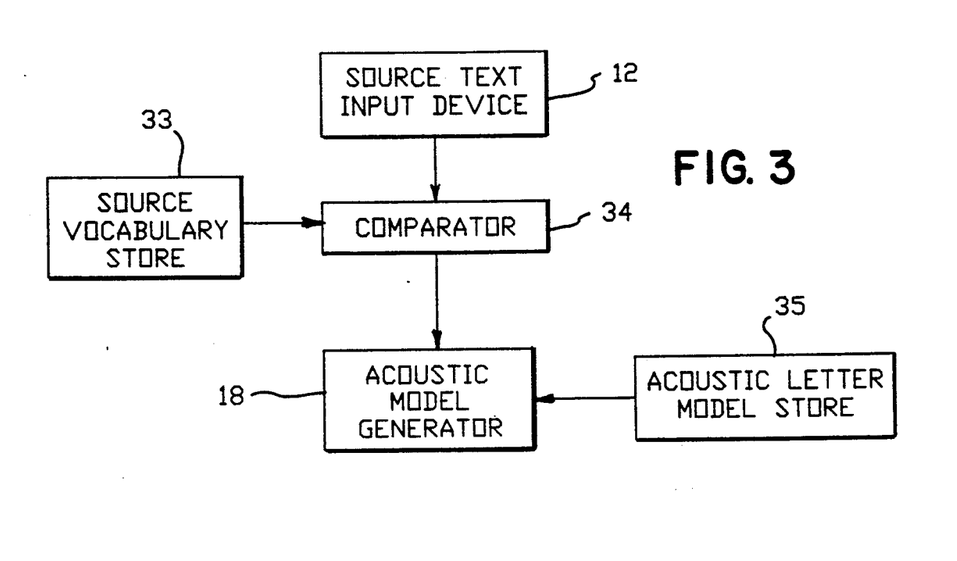
FIG. 3 is a block diagram of a portion of another example of a speech recognition system according to the invention.

FIG. 3 is a block diagram of a portion of an example of a speech recognition system according to the invention. In this embodiment of the invention, the system comprises a source vocabulary store 33 for storing the source language vocabulary. A comparator 34 compares each source text word provided by source text input device 12 to each word in the source language vocabulary store 33 for the purpose of identifying each word in the source text that is not a word in the source language vocabulary. The acoustic model generator 18 generates an acoustic model of at least one word in the source text which is not in the source vocabulary.

The comparator 34 may also construct, for each word in the source text that is not a word in the source language vocabulary, a sequence of characters that may be a translation of that word into the target language, and place any such possible translations into the target language vocabulary (not shown). In one embodiment of the invention, this comparator may operate according to a set of rules that describe the manner in which letters in the source language should be rewritten when translated into the target language. For example, if the source language is French and the target language is English, then this set of rules might include the rule that the string of characters phobie should be rewritten as phobia so that the French word hydrophobie is transformed into the English word hydrophobia. Other rules in such a system specify the dropping of accents from letters, or the modification of verbal endings.

The comparator 34 may also identify words in the source text that begin with an uppercase letter, but do not appear in the source language vocabulary, and place them into the target language vocabulary. Referring again to the example of French as the source language and English as the target language, if the word Microsoft appears in the source text, but not in the source language vocabulary, then it is added to the target language vocabulary. Many proper names are missing from even large vocabularies and yet are often translated directly from one language to another with no change in spelling.

In one embodiment of the invention, the acoustic model generator 18 generates an acoustic model of a word by replacing each letter in the spelling of the word with an acoustic letter model, from an acoustic letter model store 35, corresponding to the letter. (See, for example, L. R. Bahl, et al. "Automatic Determination of Pronunciation of Words From Their Spellings." *IBM Technical Disclosure Bulletin*, Volume 32, No. 10B, March 1990, pages 19-23; and J. M. Lucassen, et al. "An Information Theoretic Approach To The Automatic Determination of Phonemic Baseforms." *Proceedings of the 1984 IEEE International Conference on Acoustic and Signal Processing*, Vol. 3, pages 42.5.1-42.5.4, March 1984.)

In the speech recognition system according to the invention, the acoustic model generator 18, the acoustic match score generator 24, the translation match score generator 26, the hypothesis generator 16, the hypothesis score generator 28, and the comparator 34 may be made by programming a general purpose or special purpose digital computer system. The source text input device 12, the best hypothesis store 30, the source vocabulary store 33, and the acoustic letter model store 35 may comprise a computer memory, such as a read only memory or a read/write memory. The output device 32 may be, for example, a display, such as a cathode ray tube or liquid crystal display, a printer, a loudspeaker, or a speech synthesizer.

Figure 4:
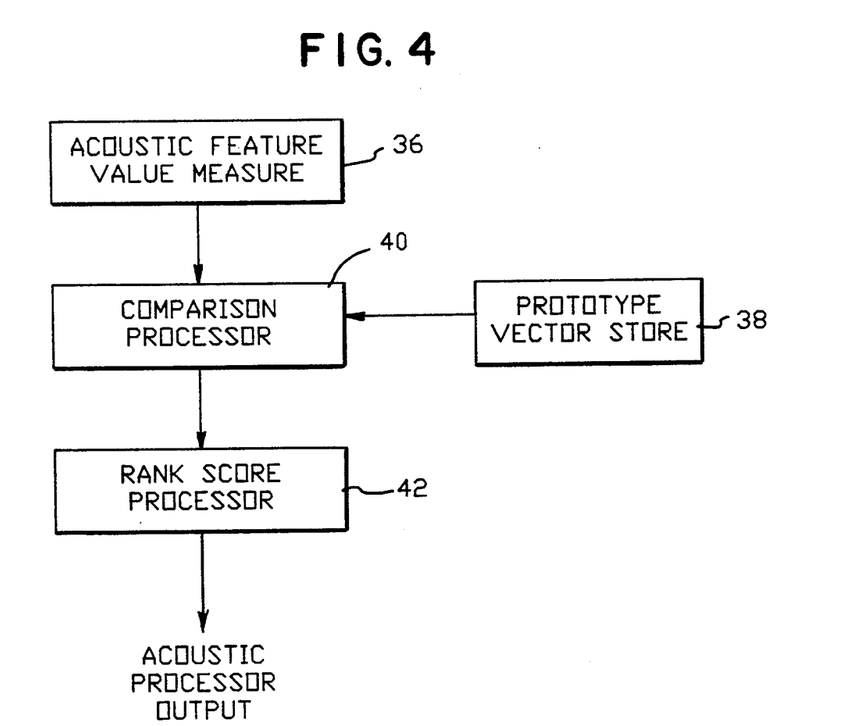
FIG. 4 is a block diagram of an example of an acoustic processor for a speech recognition system according to the invention.

FIG. 4 is a block diagram of an example of an acoustic processor 14 (FIG. 1) for a speech recognition apparatus according to the present invention. An acoustic feature value measure 36 is provided for measuring the value of at least one feature of an utterance over each of a series of successive time intervals to produce a series of feature vector signals representing the feature values. Table 1 illustrates a hypothetical series of one-dimension feature vector signals corresponding to time intervals t1, t2, t3, t4, and t5, respectively.

TABLE 1

| time | t1 | t2 | t3 | t4 | t5 |
|---|---|---|---|---|---|
| Feature Value | 0.18 | 0.52 | 0.96 | 0.61 | 0.84 |

A prototype vector store 38 stores a plurality of prototype vector signals. Each prototype vector signal has at least one parameter value and has a unique identification value.

Table 2 shows a hypothetical example of five prototype vectors signals having one parameter value each, and having identification values P1, P2, P3, P4, and P5, respectively.

TABLE 2

| Prototype Vector Identification Value | P1 | P2 | P3 | P4 | P5 |
|---|---|---|---|---|---|
| Parameter Value | 0.45 | 0.59 | 0.93 | 0.76 | 0.21 |

A comparison processor 40 compares the closeness of the feature value of each feature vector signal to the parameter values of the prototype vector signals to obtain prototype match scores for each feature vector signal and each prototype vector signal.

Table 3 illustrates a hypothetical example of prototype match scores for the feature vector signals of Table 1, and the prototype vector signals of Table 2.

TABLE 3

| | Prototype Vector Match Scores | | | | |
|---|---|---|---|---|---|
| time | t1 | t2 | t3 | t4 | t5 |
| Prototype Vector Identification Value | | | | | |
| P1 | 0.27 | 0.07 | 0.51 | 0.16 | 0.39 |
| P2 | 0.41 | 0.07 | 0.37 | 0.02 | 0.25 |
| P3 | 0.75 | 0.41 | 0.03 | 0.32 | 0.09 |
| P4 | 0.58 | 0.24 | 0.2 | 0.15 | 0.08 |

TABLE 3-continued

| | Prototype Vector Match Scores | | | | |
|---|---|---|---|---|---|
| P5 | 0.03 | 0.31 | 0.75 | 0.4 | 0.63 |

In the hypothetical example, the feature vector signals and the prototype vector signal are shown as having one dimension only, with only one parameter value for that dimension. In practice, however, the feature vector signals and prototype vector signals may have, for example, fifty dimensions, where each dimension has two parameter values. The two parameter values of each dimension may be, for example, a mean value and a standard deviation (or variance) value.

Still referring to FIG. 4, the speech recognition and speech coding apparatus further comprise a rank score processor 42 for associating, for each feature vector signal, a first-rank score with the prototype vector signal having the best prototype match score, and a second-rank score with the prototype vector signal having the second best prototype match score.

Preferably, the rank score processor 42 associates a rank score with all prototype vector signals for each feature vector signal. Each rank score represents the estimated closeness of the associated prototype vector signal to the feature vector signal relative to the estimated closeness of all other prototype vector signals to the feature vector signal. More specifically, the rank score for a selected prototype vector signal for a given feature vector signal is monotonically related to the number of other prototype vector signals having prototype match scores better than the prototype match score of the selected prototype vector signal for the given feature vector signal.

Table 4 shows a hypothetical example of prototype vector rank scores obtained from the prototype match scores of Table 3.

TABLE 4

| | Prototype Vector Rank Scores | | | | |
|---|---|---|---|---|---|
| time | t1 | t2 | t3 | t4 | t5 |
| Prototype Vector Identification Value | | | | | |
| P1 | 2 | 1 | 4 | 3 | 4 |
| P2 | 3 | 1 | 3 | 1 | 3 |
| P3 | 5 | 5 | 1 | 4 | 2 |
| P4 | 4 | 3 | 2 | 2 | 1 |
| P5 | 1 | 4 | 5 | 5 | 5 |

As shown in Tables 3 and 4, the prototype vector signal P5 has the best (in this case the closest) prototype match score with the feature vector signal at time t1 and is therefore associated with the first-rank score of "1". The prototype vector signal P1 has the second best prototype match score with the feature vector signal at time t1, and therefore is associated with the second-rank score of "2". Similarly, for the feature vector signal at time t1, prototype vector signals P2, P4, and P3 are ranked "3", "4" and "5" respectively. Thus, each rank score represents the estimated closeness of the associated prototype vector signal to the feature vector signal relative to the estimated closeness of all other prototype vector signals to the feature vector signal.

Alternatively, as shown in Table 5, it is sufficient that the rank score for a selected prototype vector signal for a given feature vector signal is monotonically related to the number of other prototype vector signals having prototype match scores better than the prototype match score of the selected prototype vector signal for the given feature vector signal. Thus, for example, prototype vector signals P5, P1, P2, P4, and P3 could have been assigned rank scores of "1", "2", "3", "3" and "3", respectively. In other words, the prototype vector signals can be ranked either individually, or in groups.

TABLE 5

| | Prototype Vector Rank Scores (alternative) | | | | |
|---|---|---|---|---|---|
| time | t1 | t2 | t3 | t4 | t5 |
| Prototype Vector Identification Value | | | | | |
| P1 | 2 | 1 | 3 | 3 | 3 |
| P2 | 3 | 1 | 3 | 1 | 3 |
| P3 | 3 | 3 | 1 | 3 | 2 |
| P4 | 3 | 3 | 2 | 2 | 1 |
| P5 | 1 | 3 | 3 | 3 | 3 |

In addition to producing the rank scores, rank score processor 42 outputs, for each feature vector signal, at least the identification value and the rank score of the first-ranked prototype vector signal, and the identification value and the rank score of the second-ranked prototype vector signal, as a coded utterance representation signal of the feature vector signal, to produce a series of coded utterance representation signals.

Figure 5:
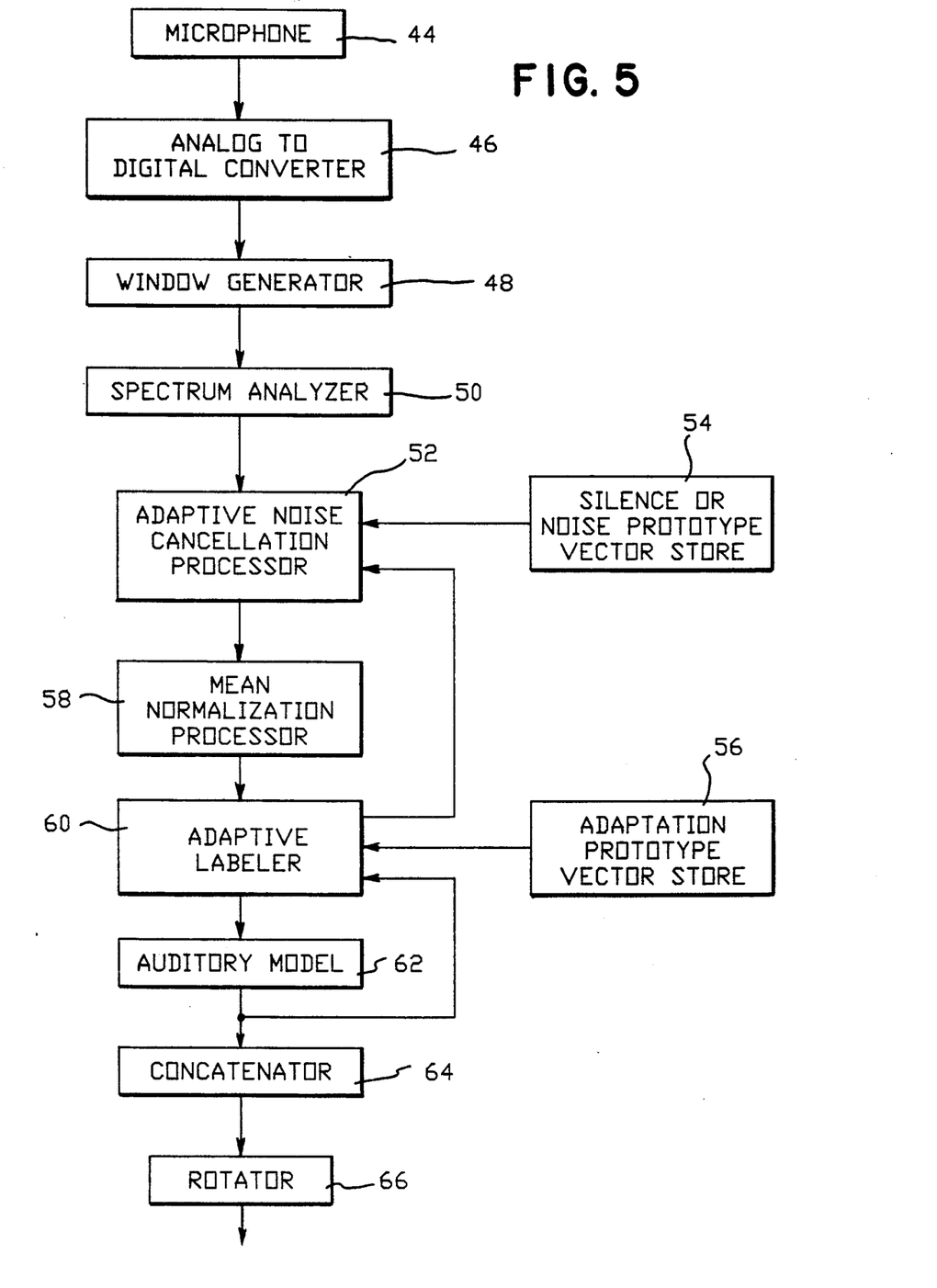
FIG. 5 is a block diagram of an example of an acoustic feature value measure for an acoustic processor for a speech recognition system according to the invention.

One example of an acoustic feature value measure is shown in FIG. 5. The measuring means includes a microphone 44 for generating an analog electrical signal corresponding to the utterance. The analog electrical signal from microphone 44 is converted to a digital electrical signal by analog to digital converter 46. For this purpose, the analog signal may be sampled, for example, at a rate of twenty kilohertz by the analog to digital converter 46.

A window generator 48 obtains, for example, a twenty millisecond duration sample of the digital signal from analog to digital converter 46 every ten milliseconds (one centisecond). Each twenty millisecond sample of the digital signal is analyzed by spectrum analyzer 50 in order to obtain the amplitude of the digital signal sample in each of, for example, twenty frequency bands. Preferably, spectrum analyzer 50 also generates a twenty-first dimension signal representing the total amplitude or total power of the twenty millisecond digital signal sample. The spectrum analyzer 50 may be, for example, a fast Fourier transform processor. Alternatively, it may be a bank of twenty band pass filters.

The twenty-one dimension vector signals produced by spectrum analyzer 50 may be adapted to remove background noise by an adaptive noise cancellation processor 52. Noise cancellation processor 52 subtracts a noise vector N(t) from the feature vector F(t) input into the noise cancellation processor to produce an output feature vector F'(t). The noise cancellation processor 52 adapts to changing noise levels by periodically updating the noise vector N(t) whenever the prior feature vector F(t−1) is identified as noise or silence. The noise vector N(t) is updated according to the formula $$N(t) = N(t-1) + k[F(t-1) - F_p(t-1)],$$ [18]

where N(t) is the noise vector at time t, N(t−1) is the noise vector at time (t−1), k is a fixed parameter of the adaptive noise cancellation model, F'(t−1) is the feature vector output from the noise cancellation processor 52 at time (t−1) and which represents noise or silence, and Fp(t−1) is one silence or noise prototype vector, from store 54, closest to feature vector F'(t−1).

The prior feature vector $F(t-1)$ is recognized as noise or silence if either (a) the total energy of the vector is below a threshold, or (b) the closest prototype vector in adaptation prototype vector store 56 to the feature vector is a prototype representing noise or silence. For the purpose of the analysis of the total energy of the feature vector, the threshold may be, for example, the fifth percentile of all feature vectors (corresponding to both speech and silence) produced in the two seconds prior to the feature vector being evaluated.

After noise cancellation, the feature vector $F'(t)$ is normalized to adjust for variations in the loudness of the input speech by short term mean normalization processor 58. Normalization processor 58 normalizes the twenty-one dimension feature vector $F'(t)$ to produce a twenty dimension normalized feature vector $X(t)$. The twenty-first dimension of the feature vector $F'(t)$, representing the total amplitude or total power, is discarded. Each component i of the normalized feature vector $X(t)$ at time t may, for example, be given by the equation $$Xi(t) = F'_i(t) - Z(t) \quad [19]$$

in the logarithmic domain, where $F'_i(t)$ is the i-th component of the unnormalized vector at time t, and where $Z(t)$ is a weighted mean of the components of $F'(t)$ and $Z(t-1)$ according to Equations 20 and 21:

$$Z(t) = 0.9Z(t-1) + 0.1M(t) \quad [20]$$

and where $$M(t) = \frac{1}{20} \sum_i F_i(t) \quad [21]$$

The normalized twenty dimension feature vector $X(t)$ may be further processed by an adaptive labeler 60 to adapt to variations in pronunciation of speech sounds. An adapted twenty dimension feature vector $X'(t)$ is generated by subtracting a twenty dimension adaptation vector $A(t)$ from the twenty dimension feature vector $X(t)$ provided to the input of the adaptive labeler 60. The adaptation vector $A(t)$ at time t may, for example, be given by the formula $$A(t) = A(t-1) + k[X'(t-1) - Xp(t-1)], \quad [22]$$

where k is a fixed parameter of the adaptive labeling model, $X'(t-1)$ is the normalized twenty dimension vector output from the adaptive labeler 60 at time $(t-1)$, $Xp(t-1)$ is the adaptation prototype vector (from adaptation prototype store 56) closest to the twenty dimension feature vector $X'(t-1)$ at time $(t-1)$, and $A(t-1)$ is the adaptation vector at time $(t-1)$.

The twenty dimension adapted feature vector signal $X'(t)$ from the adaptive labeler 60 is preferably provided to an auditory model 62. Auditory model 62 may, for example, provide a model of how the human auditory system perceives sound signals. An example of an auditory model is described in U.S. Pat. No. 4,980,918 to Bahl et al entitled "Speech Recognition System with Efficient Storage and Rapid Assembly of Phonological Graphs".

Preferably, according to the present invention, for each frequency band i of the adapted feature vector signal $X'(t)$ at time t, the auditory model 62 calculates a new parameter $E_i(t)$ according to Equations 23 and 24:

$$E_i(t) = K_1 + K_2(X_i'(t))(N_i(t-1)) \quad [23]$$

where $$N_i(t) = K_3 \times N_i(t-1) - E_i(t-1) \quad [24]$$

and where $K_1$, $K_2$, and $K_3$ are fixed parameters of the auditory model.

For each centisecond time interval, the output of the auditory model 62 is a modified twenty dimension feature vector signal. This feature vector is augmented by a twenty-first dimension having a value equal to the square root of the sum of the squares of the values of the other twenty dimensions.

For each centisecond time interval, a concatenator 64 preferably concatenates nine twenty-one dimension feature vectors representing the one current centisecond time interval, the four preceding centisecond time intervals, and the four following centisecond time intervals to form a single spliced vector of 189 dimensions. Each 189 dimension spliced vector is preferably multiplied in a rotator 66 by a rotation matrix to rotate the spliced vector and to reduce the spliced vector to fifty dimensions.

The rotation matrix used in rotator 66 may be obtained, for example, by classifying into M classes a set of 189 dimension spliced vectors obtained during a training session. The inverse of the covariance matrix for all of the spliced vectors in the training set is multiplied by the within-sample covariance matrix for all of the spliced vectors in all M classes. The first fifty eigenvectors of the resulting matrix form the rotation matrix. (See, for example, "Vector Quantization Procedure For Speech Recognition Systems Using Discrete Parameter Phoneme-Based Markov Word Models" by L. R. Bahl, et al, *IBM Technical Disclosure Bulletin*, Volume 32, No. 7, December 1989, pages 320 and 321.)

Window generator 48, spectrum analyzer 50, adaptive noise cancellation processor 52, short term mean normalization processor 58, adaptive labeler 60, auditory model 62, concatenator 64, and rotator 66, may be suitably programmed special purpose or general purpose digital signal processors. Prototype stores 54 and 56 may be electronic computer memory of the types discussed above.

The prototype vectors in prototype store 38 may be obtained, for example, by clustering feature vector signals from a training set into a plurality of clusters, and then calculating the mean and standard deviation for each cluster to form the parameter values of the prototype vector. When the training script comprises a series of word-segment models (forming a model of a series of words), and each word-segment model comprises a series of elementary models having specified locations in the word-segment models, the feature vector signals may be clustered by specifying that each cluster corresponds to a single elementary model in a single location in a single word-segment model. Such a method is described in more detail in U.S. patent application Ser. No. 730,714, filed on Jul. 16, 1991, entitled "Past Algorithm for Deriving Acoustic Prototypes for Automatic Speech Recognition."

Alternatively, all acoustic feature vectors generated by the utterance of a training text and which correspond to a given elementary model may be clustered by K-means Euclidean clustering or K-means Gaussian clustering, or both. Such a method is described, for example, in U.S. patent application Ser. No. 673,810, filed on Mar. 22, 1991 entitled "Speaker-Independent Label Coding Apparatus".

We claim:

1. A speech recognition system comprising:
    means for displaying a source text comprising one or more words in a source language;
    an acoustic processor: for generating a sequence of coded representations of an utterance to be recognized, said utterance comprising one or more words in a target language different from the source language;
    means for generating a set of one or more speech hypotheses, each speech hypothesis comprising one or more words from the target language;
    means for generating an acoustic model of each speech hypothesis;
    means for generating an acoustic match score for each speech hypothesis, each acoustic match score comprising an estimate of the closeness of a match between the acoustic model of the speech hypothesis and the sequence of coded representations of the utterance;
    means for generating a translation match score for each speech hypothesis, each translation match score comprising an estimate of the probability of occurrence of the speech hypothesis given the occurrence, of the source text;
    means for generating a hypothesis score for each hypothesis, each hypothesis score comprising a combination of the acoustic match score and the translation match score for the hypothesis;
    means for storing a subset of one or more speech hypotheses, from the set of speech hypotheses, having the best hypothesis scores; and
    means for outputting at least one word of one or more of the speech hypotheses in the subset of speech hypotheses having the best hypothesis scores.

2. A speech recognition system as claimed in claim 1, characterized in that:
    the system further comprises means for generating a set of candidate words consisting solely of words in the target language which are partial or full translations of words in the source text; and
    the speech hypothesis generator generates one or more speech hypotheses solely from words in the set of candidate words.

3. A speech recognition system as claimed in claim 1, characterized in that the translation match score for a speech hypothesis comprises an estimate of the probability of occurrence of the source text given the occurrence of the speech hypothesis combined with an estimate of the probability of occurrence of the speech hypothesis.

4. A speech recognition system as claimed in claim 3, characterized in that the probability of occurrence of the source text given the occurrence of the speech hypothesis comprises an estimate, for each word in the source text, of the probability of the word in the source text given the occurrence of each word in the speech hypothesis.

5. A speech recognition system as claimed in claim 1, characterized in that the acoustic match score comprises an estimate of the probability of occurrence of the sequence of coded representations of the utterance given the occurrence of the speech hypothesis.

6. A speech recognition system as claimed in claim 5, characterized in that the hypothesis score comprises the product of the acoustic match score multiplied by the translation match score.

7. A speech recognition system as claimed in claim 1, further comprising:
    means for storing a source vocabulary of words in the source language;
    means for comparing each word in the source text with each word in the source vocabulary to identify each word in the source text which is not in the source vocabulary; and
    means for generating an acoustic model of at least one word in the source text which is not in the source vocabulary.

8. A speech recognition system as claimed in claim 7, characterized in that:
    each word in the source text has a spelling comprising one or more letters, each letter being upper case or being lower case;
    the system further comprises means for identifying each word in the source text which has an upper case first letter; and
    the means for generating an acoustic model generates an acoustic model of each word in the source text which is not in the source vocabulary, and which has an upper case first letter.

9. A speech recognition system as claimed in claim 7, characterized in that the means for generating an acoustic model comprises:
    means for storing a plurality of acoustic letter models; and
    means for generating an acoustic model of a word by replacing each letter in the spelling of the word with an acoustic letter model corresponding to the letter.

10. A speech recognition system as claimed in claim 1, characterized in that the output means comprises a display.

11. A speech recognition system as claimed in claim 10, characterized in that the display comprises a cathode ray tube.

12. A speech recognition system as claimed in claim 10, characterized in that the display comprises a liquid crystal display.

13. A speech recognition system as claimed in claim 1 characterized in that the output means comprises a printer.

14. A speech recognition system as claimed in claim 1, characterized in that the output means comprises a loudspeaker.

15. A speech recognition system as claimed in claim 1, characterized in that the output means comprises a speech synthesizer.

16. A speech recognition system as claimed in claim 1, characterized in that the means for storing speech hypotheses comprises readable computer memory.

17. A speech recognition system as claimed in claim 1, characterized in that the acoustic processor comprises:
    means for measuring the value of at least one feature of an utterance over each of a series of successive time intervals to produce a series of feature vector signals representing the feature values;
    means for storing a plurality of prototype vector signals, each prototype vector signal having at least one parameter value and having a unique identification value;
    means for comparing the closeness of the feature value of a first feature vector signal to the parameter values of the prototype vector signals to obtain prototype match scores for the first feature vector signal and each prototype vector signal;

ranking means for associating a first-rank score with the prototype vector signal having the best prototype match score, and for associating a second-rank score with the prototype vector signal having the second best prototype match score; and means for outputting at least the identification value and the rank score of the first-ranked prototype vector signal, and the identification value and the rank score of the second-ranked prototype vector signal, as a coded utterance representation signal of the first feature vector signal.

18. A speech recognition system as claimed in claim 17, characterized in that the means for measuring the value of at least one feature of an utterance comprises a microphone.

19. A speech recognition method comprising:

displaying a source text comprising one or more words in a source language;

generating a sequence of coded representations of an utterance to be recognized, said utterance comprising one or more words in a target language different from the source language;

generating a set of one or more speech hypotheses, each speech hypothesis comprising one or more words from the target language;

generating an acoustic model of each speech hypothesis;

generating an acoustic match score for each speech hypothesis, each acoustic match score comprising an estimate of the closeness of a match between the acoustic model of the speech hypothesis and the sequence of coded representations of the utterance;

generating a translation match score for each speech hypothesis, each translation match score comprising an estimate of the probability of occurrence of the speech hypothesis given the occurrence of the source text;

generating a hypothesis score for each hypothesis, each hypothesis score comprising a combination of the acoustic match score and the translation match score for the hypothesis;

storing a subset of one or more speech hypotheses, from the set of speech hypotheses, having the best hypothesis scores; and outputting at least one word of one or more of the speech hypotheses in the subset of speech hypotheses having the best hypothesis scores.

20. A speech recognition method as claimed in claim 19, characterized in that:

the method further comprises the step of generating a set of candidate words consisting solely of words in the target language which are partial or full translations of words in the source text; and the step of generating speech hypotheses generates one or more speech hypotheses solely from words in the set of candidate words.

21. A speech recognition method as claimed in claim 19, characterized in that the translation match score for a speech hypothesis comprises an estimate of the probability of occurrence of the source text given the occurrence of the speech hypothesis combined with an estimate of the probability of occurrence of the speech hypothesis.

22. A speech recognition method as claimed in claim 21, characterized in that the probability of occurrence of the source text given the occurrence of the speech hypothesis comprises an estimate, for each word in the source text, of the probability of the word in the source text given the occurrence of each word in the speech hypothesis.

23. A speech recognition method as claimed in claim 19, characterized in that the acoustic match score comprises an estimate of the probability of occurrence of the sequence of coded representations of the utterance given the occurrence of the speech hypothesis.

24. A speech recognition method as claimed in claim 23, characterized in that the hypothesis score comprises the product of the acoustic match score multiplied by the translation match score.

25. A speech recognition method as claimed in claim 19, further comprising the steps of:

storing a source vocabulary of words in the source language;

comparing each word in the source text with each word in the source vocabulary to identify each word in the source text which is not in the source vocabulary; and generating an acoustic model of at least one word in the source text which is not in the source vocabulary.

26. A speech recognition method is claimed in claim 25, characterized in that:

each word in the source text bas a spelling comprising one or more letters, each letter being upper case or being lower case;

the method further comprises the step of identifying each word in the source text which has an upper case first letter; and the step of generating an acoustic model comprises generating an acoustic model of each word in the source text which is not in the source vocabulary, and which has an upper case first letter.

27. A speech recognition method as claimed in claim 25, characterized in that the step of generating an acoustic model comprises:

storing a plurality of acoustic letter models; and generating an acoustic model of a word by replacing each letter in the spelling of the word with an acoustic letter model corresponding to the letter.

28. A speech recognition method as claimed in claim 19, characterized in that the output means comprises a display.

29. A speech recognition method as claimed in claim 28, characterized in that the display comprises a cathode ray tube.

30. A speech recognition method as claimed in claim 28, characterized in that the display comprises a liquid crystal display, 31. A speech recognition method as claimed in claim 19, characterized in that the output means comprises a printer.

32. A speech recognition method as claimed in claim 19, characterized in that the output means comprises a loudspeaker.

33. A speech recognition method as claimed in claim 19, characterized in that the output means comprises a speech synthesizer.

34. A speech recognition method as claimed in claim 19, characterized in that the means for storing speech hypotheses comprises readable computer memory.

35. A speech recognition method as claimed in claim 19, characterized in that the acoustic processor comprises:

means for measuring the value of at least one feature of an utterance over each of a series of successive time intervals to produce a series of feature vector signals representing the feature values;

means for storing a plurality of prototype vector signals, each prototype vector signal having at least one parameter value and having a unique identification value;

means for comparing the closeness of the feature value of a first feature vector signal to the parameter values of the prototype vector signals to obtain prototype match scores for the first feature vector signal and each prototype vector signal;

ranking means for associating a first-rank score with the prototype vector signal having the best prototype match score, and for associating a second-rank score with the prototype vector signal having the second best prototype match score; and means for outputting at least the identification value and the rank score of the first-ranked prototype vector signal, and the identification value and the rank score of the second-ranked prototype vector signal, as a coded utterance representation signal of the first feature vector signal.

36. A speech recognition method as claimed in claim 35, characterized in that the means for measuring the value of at least one feature of in utterance comprises a microphone.

* * * * *